INVENTORS
CURTISS R. SCHAFER
WILLIAM J. MORLEY
BY George H. Fisher
ATTORNEY

Aug. 7, 1951  C. R. SCHAFER ET AL  2,563,280
LIQUID LEVEL MEASURING APPARATUS
Filed Jan. 29, 1945  4 Sheets-Sheet 4

INVENTORS
CURTISS R. SCHAFER
WILLIAM J. MORLEY
BY George H. Fisher
ATTORNEY

Patented Aug. 7, 1951

2,563,280

UNITED STATES PATENT OFFICE 2,563,280

LIQUID LEVEL MEASURING APPARATUS

Curtiss R. Schafer, Plymouth Township, Minn., and William J. Morley, River Forest, Ill., assignors to Minneapolis-Honeywell Regulator Company, Minneapolis, Minn., a corporation of Delaware Application January 29, 1945, Serial No. 575,168

18 Claims. (Cl. 73—304)

Our invention relates to the field of liquid level indication, and more particularly to the indication of the quantity of fuel available in the fuel tanks of aircraft.

It is an object of our invention to provide a new and improved system for remotely indicating the quantity of liquid in a container.

It is another object of our invention to provide a new and improved type of indicator for incorporation in our improved system.

It is another object of our invention to provide a new and improved indicating system for showing remotely the quantity of liquid in a tank of irregular cross-sectional area.

It is another object of our invention to provide a new and improved system for indicating the total quantity of liquid in a plurality of containers.

Another object of our invention is to provide a system for indicating the total quantity of fluid in a plurality of containers, together with means altering the system to indicate the quantity of liquid in any one container.

It is a further object of our invention to provide a new and improved electrically energized indicating system for showing the quantity of fuel in a container, together with means for indicating interruption of the normal electric energization of the system.

It is a further object of our invention to provide a new and improved electrically energized system for indicating the total amount of fuel in a plurality of containers, together with means for indicating interruption of normal energization of the system.

Yet another object of our invention is to provide a new and improved indicator for the quantity of liquid in the container, together with means for indicating when the quantity of said liquid is less than a predetermined minimum.

A still further object of our invention is to provide a new and improved system for indicating the quantity of fuel in a plurality of containers, together with means for adapting the system to indicate the quantity of fuel in a single container, and with means for indicating when the quantity of liquid being indicated is less than a certain minimum.

Various other objects, advantages, and features of novelty which characterize our invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which we have illustrated and described a preferred embodiment of our invention.

In present multi-engine aircraft, it is customary to provide as many primary fuel tanks as there are engines in the craft, so that ordinarily each engine is provided with fuel from its own tank. This is desirable so that as the fuel is drawn out of the tank by the engine the load carried by the craft diminishes equally about its center of gravity. In the larger craft, additional storage tanks are provided so that the cruising radius of the craft is not limited by the capacity of the primary fuel tanks, and it devolves upon the flight engineer to maintain a proper supply of fuel in each of the primary tanks, distributing fuel from the auxiliary tanks to the primary tanks and from one primary tank to another as the situation requires: in smaller craft this function is performed by the pilot. It is apparent that sensitive, accurate, rugged instruments for indicating the amount of fuel in the primary tanks are necessary for the intelligent conduct of an extended flight. It also follows that a single indicator showing only the total amount of fuel remaining in all the tanks of the craft, while of course highly desirable, does not provide sufficiently complete information, whereas the provision of an indicator for the contents of each of the principal fuel tanks is of much greater utility.

Figures 1, 1A:
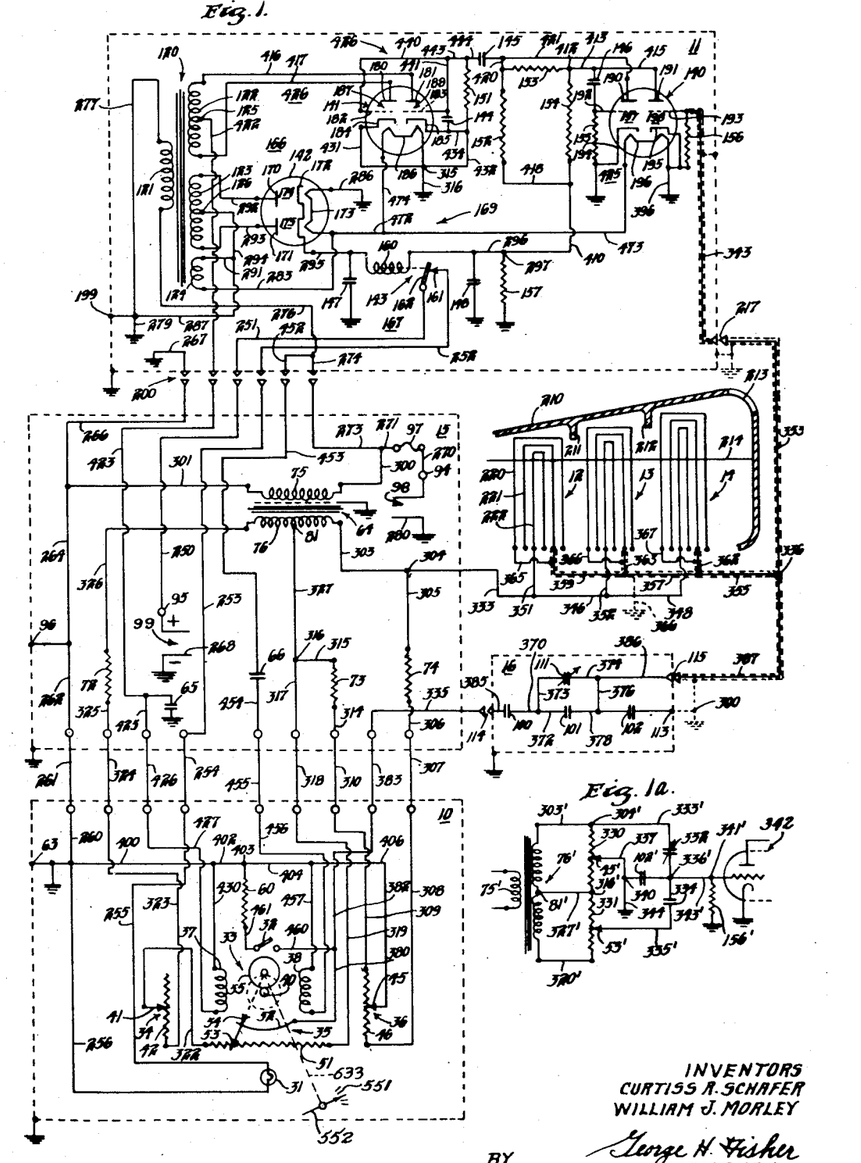
Figure 1 is a schematic diagram of one of the sets of identical components comprised in one embodiment of our invention.
Figure 1a is a simplified schematic diagram of a portion of the subject matter of Figure 1.

In the embodiment of our invention disclosed in Figure 1 we illustrate a complete fuel indicating system for a single engine; that is, for a single primary fuel tank. A plurality of these systems may be combined on the pilot's or the flight engineer's instrument panel as suggested in Figure 4, the number of such instruments being determined by the number of engines in the craft. The subject matter schematically illustrated in Figure 1 therefore represents one of a number of identical components of a complete system.

Referring now to Fig. 1, it will be seen that our invention, as most conveniently embodied, comprises a panel unit 10, an amplifier and motor control unit 11, a plurality of variable capacitance pickup units 12, 13, and 14, a junction box 15, and a condenser box 16. The various units are connected together by suitable electrical conductors, and are comprised of circuit components as will now be set forth.

Panel unit 10 includes a visual indicator 31, a single pole single throw test switch 32, a resistor 60, a motor 33, a variable resistor 34, and two potential dividers 35 and 36. We have illustrated visual indicator 31 as comprising a signal lamp, but any equivalent visual indicator of a suitable nature may be substituted, if desired.

Variable resistor 34 comprises a contacting slider 41 moving over a resistance member 42. Potential divider 36 comprises a contacting slider 45 moving over a resistance member 46. Potential divider 35 comprises a resistance member 51 and a contact arc 52. A pair of electrically connected contacting sliders 53 and 54 complete the circuit between contact arc 52 and resistance member 51. Motor 33 comprises a pair of field windings 37 and 38 and an armature 40, which actuates a shaft 606, carrying sliders 53 and 54 of potential divider 35, through a gear train 55. As will be set forth more fully below, motor 33 also drives a needle 552 with respect to a graduated scale 551, through a suitable mechanical connection 633 to shaft 606. A terminal 63 is provided for connection of the panel unit circuit with ground at the panel.

Junction box 15 includes a transformer 64 having a primary winding 75 and a secondary winding 76 which is center tapped at 81, a pair of condensers 65 and 66, and a plurality of resistors 72, 73, and 74. A terminal 94 is provided for connection to the ungrounded side of a source 98 of alternating current, and a fuse 97 is provided to protect this line against overloading. Source 98 may conveniently comprise a plug for insertion into a conventional A. C. outlet. A terminal 95 is provided for connection to the ungrounded positive side of a source 99 of 28-volt direct current. Source 99 may conveniently comprise a pair of battery clips for attachment to the terminals of a suitable 28 volt storage battery. A terminal 96 is provided for connection of the junction box circuit with ground at the box.

Condenser box 16 includes fixed condensers 100, 101, and 102, and variable condenser 111: a terminal 113 is provided for connection of the condenser box circuit with ground at the box. A pair of detachable connector members 114 and 115 are provided for connecting the circuit elements contained in box 16 with the junction box and with the tank units respectively. Of these, connector 115 is of the type adapted for use with shielded cable.

Amplifier and motor control unit 11 comprises a transformer 120 having a primary winding 121 and a plurality of secondary windings 122, 123, and 124, the first two being center tapped as at 125 and 126. Unit 11 also includes a plurality of triodes 187, 188, 197, and 198, a pair of diodes 174 and 175, a plurality of condensers 144, 145, 146, 147, and 148, and a plurality of resistors 151, 152, 153, 154, 155, 156, and 157. There is also provided a relay 143 comprising a solenoid winding 160 which actuates a contact arm 162 to move away from a fixed contact 161: in the normal or deenergized condition of relay 143 a closed electrical circuit is provided between arm 161 and contact 162. Diodes 174 and 175 include respectively plates 170 and 171 and have a common cathode 172 and a common heater 173. Triodes 187 and 188 include respectively plates 180 and 181, grids 182 and 183, and cathodes 184 and 185; a common heater filament 186 is provided. Triodes 197 and 198 include respectively plates 190 and 191, grids 192 and 193, and cathodes 194 and 195; a common heater filament 196 is provided. A terminal 199 is provided for connection of the amplifier and motor control circuits with ground at the ground connection to the housing of unit 11. A multiple connector 200 is provided for making readily detachable connection between unit 11 and junction box 15. In addition, a single-element connector 217 of the type adapted for use with shielded cable, is provided for making connection between unit 11 and the tank units.

Tank units 12, 13, and 14 are shown as mounted for use in a tank 210 of irregular shape. This is true of the fuel tanks in most aircraft, since it is required that they be installed in somewhat circumscribed space. The tank is shown as having antisplash baffles 211 and 212, and a filler opening 213. The level of the liquid in the tank is indicated at 214. Each of sensing units 12, 13, and 14 is comprised of an outer cylindrical electrode 220, an intermediate cylindrical electrode 221, and an inner cylindrical electrode 222. In each pickup unit electrodes 221 and 222 cooperate with the air and fluid between them to act as a variable capacitor, the average dielectric coefficient and therefore the capacitance of the pickup unit varying with change in the level of fluid between the electrodes.

The general operation of our invention is as follows. The amount of fluid in container 210 determines the total capacitance of pickup units 12, 13, and 14; and the voltage drop across this capacitance, due to flow of alternating current in a first circuit including the pickup units, is compared with the voltage drop across the effective capacitance of a "standard" capacitor comprising capacitors 100, 101, and 111, due to flow of alternating current in a second circuit including the standard capacitor. Flow of current in the first circuit is due to the alternating voltage drop in a variable portion of a first resistor assembly (74, 36, 73) across which a constant voltage is maintained, and flow of current in the second circuit is due to the alternating voltage drops in variable portions of two resistor assemblies (74, 36, 73 and 35, 34, 72) across which constant voltages are maintained, one of these portions being the remaining portion of the first resistor assembly. The two circuits have a common impedance branch including resistor 156 and capacitor 102.

If the ratio of the voltage drops across the capacitors is equal to the ratio of the voltage drops across the resistors, the alternating currents in the common impedance branch are equal in amplitude and opposite in phase, and no signal voltage appears across the branch. If the ratios are not equal, an alternating signal voltage appears across the impedance branch and is impressed upon the input of the amplifier. The signal voltage is in phase with the source energizing the resistor assemblies, or 180 degrees out of phase therewith, depending on which of the currents in the impedance branch is the larger; that is, on which of the ratios exceeds the other. The amplifier acts in response to the signal voltage to energize motor 33 which adjusts the variable portion of resistor assembly 35, 34, 72 to affect the ratio of the voltage drops across the resistors in such a direction as to equalize the ratios, when the signal voltage disappears and operation of the motor is interrupted. The motor also actuates a pointer to move across a graduated scale. Variation of the variable portion of the first resistor assembly makes it possible to make the ratios equal when the pointer is at "empty" and the tank is empty. Variation of resistor 34 varies the current flow in the second resistor assembly independently of current in the first assembly, for making the ratios again equal when the pointer is at "full" and the container is full. Relay 143 operates visual signal 31 from a source of unidirectional voltage if the source of alternating voltage fails, and closing of switch 32 shorts out the standard capacitor for checking operation of the system.

Because of the fact that a plurality of tank units are used in each tank, our system is particularly adapted for use in tanks of irregular shape. As shown in Figure 1, the tank units may be selected for length and positioned in the tank, so that their combined electrical variation with change in the quantity of fluid is more nearly directly proportional to the quantity of fluid than a single measuring unit would be, and change in the position of the tank simply raises the level of fluid surrounding one unit as it lowers that surrounding another, without changing the electrical condition of the units taken all together.

The operation of this embodiment of our invention will now be described in detail. With the system otherwise deenergized, energization of the direct current line is effective to operate visual indicator 31 through a circuit which may be traced as follows: the positive side of source 99, terminal 95, conductors 250 and 251, contact arm 162 of relay 143, contact 161, conductors 252, 253, 254, and 255, visual signal 31, conductors 256, 260, 261, 262, 264, 266, and 267 to ground, and thence by conductor 268 back to the negative terminal of the source. The effect of this is to close a circuit between the battery and visual signal 31 whenever the alternating current circuit is deenergized.

Now if the A. C. line feeding the system be energized, current flows through a number of paths, a first of which may be traced as follows: from one side of source 98 to terminal 94, then through conductor 270, fuse 97, conductors 271, 273, 274, and 276, primary 121 of transformer 120, and conductors 277 and 279 to ground, thence by conductor 280 to the other side of source 98: by this circuit transformer 120 is energized. Secondary winding 124 of transformer 120 is energized by transformer action upon energization of primary winding 121, and current flows in a circuit which may be traced as follows: from the lower terminal of secondary winding 124, through conductor 283, heater 173 of diodes 174 and 175, conductor 286, the ground, and conductors 279, 287, and 291 to the upper terminal of winding 124. Alternate circuits from conductor 283 to ground may be traced through conductors 472 and 474, heater 186 of triodes 187 and 188, and through conductors 472 and 473, heater 196 of triodes 197 and 198, and conductor 396. This circuit therefore energizes the heaters of our diodes and triodes so that they attain a thermoemissive condition.

Secondary winding 123 of transformer 120 is also energized by energization of primary winding 121. The upper and lower terminals of winding 123 are connected to plates 170 and 171 of diodes 174 and 175 by conductors 292 and 293, respectively, and the center tap 126 of winding 123 is grounded through conductors 294, 287, and 279. Diodes 174 and 175 are therefore connected to comprise a full wave rectifier 166.

Condensers 147 and 148, and winding 160 of relay 143 combine to comprise a filter 167 of the condenser-input type. The input of the filter is connected to the cathode 172 of duo-diode 142 by conductor 295. Resistor 157 comprises the load resistor for the filter, to which it is connected by conductor 296: the upper terminal 297 of resistor 157 comprises the ungrounded output or positive terminal of a power supply which is generally indicated by 169 and which includes rectifier 166, filter 167 and resistor 157. Unidirectional voltage is thus derived from the alternating current supply for energizing the plate circuits of our triodes.

The bleeder current flowing through resistor 157, and the normal plate current drawn by the triodes as described below, are sufficient to cause actuation of relay 143, moving contact arm 162 away from contact 161 and interrupting the flow of direct current from the source through visual indicator 31. The indicator therefore changes from its warning condition to its normal condition, and remains in this normal condition as long as sufficient current flows in winding 160 of relay 143. It will thus be obvious that visual signal member 31 is in its operated or warning position at any time when the A. C. energization of our system for any reason fails.

Upon energization of the A. C. line, current flows in another circuit which may be traced as follows: from source 98 to terminal 94, thence through conductor 270, fuse 97, conductors 271 and 300, primary winding 75 of transformer 64, conductors 301, 266, and 267 to ground and thence through conductor 280 to the other side of the source. By this circuit transformer 64 is energized. Secondary winding 76 of transformer 64 is energized by transformer action upon energization of primary winding 75, and current flows in a circuit which may be traced as follows: the right hand terminal of winding 76, conductor 303, junction point 304, conductor 305, resistor 74, conductors 306, 307, and 308, resistance member 46 of potential divider 36, conductors 309, 310, and 314, resistor 73, conductor 315, junction point 316, and conductor 327 to center tap 81 of the transformer. By this circuit a constant voltage is impressed across a first series assembly of resistors including members 74, 36, and 73; and, for any setting of slider 45, a constant voltage drop appears between junction point 304 and slider 45. A constant voltage similarly appears between slider 45 and junction point 316. At the same time current also flows in a circuit which may be traced as follows: from center tap 81, through conductor 327, junction point 316, conductors 317, 318, and 319, resistance member 51 of potential divider 35, conductor 322, slider 41, the lower portion of resistance winding 42, conductors 323, 324, and 325, resistor 72, and conductor 326 to the left hand terminal of secondary winding 76. By this circuit a constant voltage is impressed upon a second series assembly of resistors including members 35, 34, and 72, and for any setting of sliders 41 and 45, a constant voltage drop appears between junction point 316 and slider 53.

Junction point 304 is connected with inner electrodes 222 of pickup members 12, 13, and 14 by a circuit which includes conductors 333, 345, 348, 351, and 352. The intermediate electrodes of the pickup units are connected to a junction point 336 through a circuit including conductors 355, 357, 359, 362, and 363. The latter conductors are for practical reasons made of coaxial cable, the shield being grounded to the shielding electrodes 220 of pickup units 12, 13, and 14 as indicated at 365, 366, and 367. The pickup units are thus connected in parallel.

Condensers 100 and 101 are connected together in series by conductors 370 and 372. Condenser 111 is connected in parallel with condenser 101 by conductors 372, 373, 374, 376, and 378 to provide means for adjusting the effective capacitance of the network including the three condensers. It is desirable in one version of our invention that this effective capacitance equal the capacitance of the combination of pickup units when the tank is empty. The condenser assembly is connected to slider 53 of potential divider 35 through slider 54, collector ring 52, conductors 380, 382, 383, and 335, connector 114, and conductor 385, and to junction point 336 by conductor 386, connector 115, and coaxial conductor 387, the shield of the latter being grounded to the housing unit 16 as indicated at 300.

By the foregoing arrangement we have connected the joint capacitance of the pickup units in series with the joint capacitance of the standard capacitor. The junction point 336 between the two capacitors is connected directly to the grid 193 of the first amplifier triode 198 by conductor 353, connector 217 and conductor 343. Cathode 195 of triode 198 is grounded by conductor 396 and the input circuit is completed through ground and conductors 267, 266, 264, 262, 261, 260, 400, 402, 404 and 406 to slider 45. Resistor 156 is connected between grid 193 and ground to act as a grid resistor, and condenser 102 is connected between junction point 336 and ground through conductor 387, connector 115, conductors 376 and 386 and ground terminal 113, for a purpose presently to be set forth.

A simplified fragmentary circuit which is equivalent to that disclosed in Figure 1 is shown in Figure 1a: in that circuit elements identified by primed numerals are the same as the elements referred to by the same unprimed numbers in Figure 1. Resistance 330 in Figure 1a represents the series circuit in Figure 1 including resistor 74, winding 46 of potential divider 36 and resistor 73. Similarly, resistance 331 in Figure 1a represents the series circuit in Figure 1 including resistance member 51 of potential divider 35, the effective portion of variable resistance winding 42, and resistor 72.

In Figure 1a a variable condenser 332 is shown as connected to junction point 304' by conductor 333' and a fixed condenser 334 is shown as connected to slider 53' of resistor 331 by conductor 335'. Capacitor 332 represents the effective capacitance of capacity pickups 12, 13, and 14 in Figure 1, and capacitor 334 represents the effective capacitances of capacitors 100, 101 and 111. Condensers 332 and 334 are connected to junction point 336', which comprises the output terminal for the circuit. Slider 45' of resistor 330 is grounded by conductors 337 and 344, and a further condenser 102' is connected between junction points 340 and 336', the latter being connected with input terminal 341' of an amplifier 342 by a conductor 343'.

Resistors 330 and 331 and capacitors 332 and 334 comprise a balanceable network in which the ratios between two pairs of voltage drops are compared and their difference is used as an output signal which appears between junction point 336' and slider 45'. The first ratio is that of the voltage drop between junction point 304' and slider 45' to the voltage drop between slider 45' and slider 53'. The second ratio is that of the voltage drop across capacitor 332 to the voltage drop across capacitor 334. It is to be noted that the first ratio is between the drops across resistive members, and the second is between the drops across capacitive members. If the figures-of-merit of the two condensers are of the same order, no significant distortion of the output signal occurs with relative change in the ratios.

Slider 53' is automatically moved along resistor 331, by means which will be described below, so that the desired ratio between voltage drops may be maintained as the impedance of condenser 332 varies. Thus, the voltage between junction point 304' and slider 45' remains constant for any setting of slider 45' which is fixed during use of the instrument. The voltage between conductors 333' and 335' does vary however upon movement of slider 53': this voltage is divided in proportion to the impedances of condensers 332 and 334, whose ratio determines the voltage of junction point 336'.

For illustration purposes suppose the E. M. F. on each side of center tap 81' to be 150 volts, the capacitances of condensers 332 and 334 to be 410 micromicrofarads and 460 micromicrofarads, and the resistances of resistors 330 and 331 to be equal, and suppose the slider 45' is set so that its potential with respect to function point 304' is 125 volts. Then for a condition of balance slider 53' must assume such a position that its potential with respect to 45' is 111 volts. Of this, 25 volts are supplied by the portion of resistor 330 between slider 45' and junction point 316' so that the potential difference between slider 53' and junction point 316' must be 86 volts.

If now the capacitance of condenser 332 changes to 510 micromicrofarads, the condition of balance is reached when slider 53' has assumed such a position that its potential with respect to slider 45' is 138 volts. Of this, 25 volts are still supplied by the part of resistor 330 between slider 45' and junction point 316', so that the potential difference between slider 53' and junction point 316' must be 113 volts.

With the illustrative values assumed above, movement of slider 53 can rebalance the network for any capacitance of condenser 332 between 92 and 644 micromicrofarads. Such an extended range is not necessary, and moreover is not economical in its structural requirements.

For practical reasons we have found it desirable to construct resistor 330 as a combination of two fixed resistors and one variable resistor. While this cuts down the total range through which adjustment of the arm of the bridge may be had, the available adjustment is still adequate for the amount of change to be anticipated in the impedance of the tank units, while more efficient use is made of commercially available fixed and variable resistors. In the same way, resistor 331 is more conveniently made up of fixed resistor 72 and variable resistors 35 and 34, the latter resistor being variable rather than fixed for a reason presently to be disclosed.

It has also been found desirable to substitute for the single condenser 334 a pair of condensers having the same rating and connected in series, since if only the former were used, a breakdown of the condenser would impress a relatively high voltage from contact arm 53 directly on the grid of the amplifier tube. Breakdown of both the condensers 100 and 101 at the same time is relatively unlikely.

In the practice of our invention, condensers 332 and 334 may be chosen to have equal capacitance, within customary manufacturing tolerances, and a final adjustment of variable capacitor 111 is made to insure that the standard condenser assembly has the desired effective impedance. Now as slider 45' is brought to the electrical center of resistor 330, the desired equality of the ratios we have defined occurs when slider 53' is electrically at junction point 316'.

As pointed out below, the shaft which operates slider 53' also operates a mechanical indicator in which a needle moves wtih respect to a fixed graduated scale. Because of manufacturing tolerances the position of the needle on the scale, when the above condition of zero signal is reached, may lie anywhere in a range between zero and a small maximum negative value. To bring the needle to zero, the network is unbalanced by a slight downward movement of slider 45' and again balanced by slider 53', until the needle is at its zero position.

The voltage drop between junction point 304' and slider 45' is fixed for any one position of the slider and comprises a portion, of the voltage provided by one half of the secondary winding, whose magnitude is determined by the position of slider 45'. The voltage drop between sliders 45' and 53' is made up of two portions, one fixed for any one position of slider 45' and one variable, independently of slider 45', by movement to slider 53'. The first portion is the drop between slider 45' and junction point 316' and in magnitude it comprises the difference between the output of the upper half of secondary winding 76' and the first drop just recited. The second portion is the drop between junction point 316' and slider 53', and its relation to the voltage output of the lower half of the secondary winding is determined by the position of slider 53' and also by the position of slider 41 of variable resistor 34. Because of the conductor 327' linking junction point 316' and center tap 81', the current flowing from the lower half of the secondary winding may be different from that flowing from the upper half, and the drop between junction point 316' and slider 53' is therefore adjustable not only by varying the resistance but also by varying the current flowing therethrough.

Because of the mechanical connection between slider 53' and the needle referred to, there is only one position of slider 53' on resistor 331 at which the needle is opposite the "full" point on the scale. Due to manufacturing variations, this position of the slider on various resistance windings gives varying resistance values between junction point 316' and slider 53'. Moreover, for the same reasons, the impedance of pickup member 332, and therefore the voltage drop across it, varies from unit to unit. By varying the current flowing through resistor 331, however, it is possible to obtain a voltage drop between junction point 316' and slider 53' which brings about exactly the desired equality of ratios when the tank is full and the indicator indicates full. This current variation is accomplished by variable resistor 34 which is used as a rheostat, and without changing the current flowing in the resistor 330 and therefore without change in the zero or empty setting previously made.

The calibration of the instrument is carried on as follows, reference being once more made to Figure 1. For the empty tank calibration, the container is emptied until only so much liquid remains in it as is unavailable for the intended use. Aircraft tanks, for example, have a certain residual volume of gasoline which for structural reasons is not available for the engine. After the tanks have been emptied to the required degree, slider 45 is moved along winding 46 until the network is balanced with the needle accurately at zero. Fluid is now admitted to the tank until it is full, and slider 41 is moved along winding 42 until the network is again balanced, this time with the indicator accurately at "full." The circuit may then be considered properly calibrated, as described above.

As fluid is introduced into the tank in which pickup capacitors 12, 13, and 14 are suspended, the effective capacitance changes in a fashion which will presently be described, so as to unbalance the bridge circuit. The voltage drop across the pickup capacitors no longer equals that across the standard capacitor but is exceeded by the latter. It therefore becomes necessary to move contact arm 53 downwardly along resistor 51 away from junction point 316 until such an additional voltage is taken from the drop across resistor 51 as again brings about a balanced condition of the bridge.

From the foregoing it will be seen that our invention comprises a pair of impedance members, one fixed and one variable, which are variably energized from a source of alternating voltage, means including slider 45 for establishing a desired ratio between a pair of voltage drops, and means including slider 53 for varying the energization of the impedance members simultaneously with the magnitude of the voltage ratio.

Capacitor 102 and resistor 156 jointly comprise both the output impedance of the bridge and the input or grid impedance of the amplifier. We have found that the addition of capacitor 102 in parallel with loading resistor 156 greatly improves the operation of the circuit, not only by rendering the output of the circuit linear with change in the capacitance of the pickup unit, but also by removing, within practical limits, any shift in the phase of the output signal from the bridge with change in capacitance of the pickup unit. We have observed a maximum shift of approximately 3° in the phase of the output signal from the bridge as compared to the input signal to the transformer, and this phase angle does not change for large variations in the capacitance of the pickup unit.

The means whereby slider 53 is actuated to maintain the ratio equality of the network will now be described. If the ratio of the voltage drop between terminal 304 and sliding contact 45 to the voltage drop between sliding contact 45 and sliding contact 53 is not the same as the ratio between the voltage drop across pickup units 12, 13, and 14 to the voltage drop across condensers 100, 101, and 111, slider 45 is not at the same potential as junction point 336, and an output voltage from the network therefore appears across the parallel load impedance branch including condenser 102 and resistor 156 to act through a circuit which may be traced from junction point 336 as follows: conductor 353, connector 217 and conductor 343, to grid 193 of triode 198, and the return path for this signal may be traced from cathode 195 of triode 198 to ground conductor 396, and hence back through conductors 267, 266, 264, 262, 261, 260, 400, 402, 404, and 406 to sliding contact 45. Through this circuit the voltage drop across the load impedance is impressed between grid and cathode of triode 198.

The cathode 195 has been raised to the emission temperature by energization of secondary winding 124 of transformer 120. Positive plate potential is maintained on plate 191 of triode 198 by a circuit which may be traced from terminal 297 of power supply 169 as follows: conductor 410, resistor 154, and conductors 413 and 415 to plate 191. Plate current therefore flows in the triode 198, which is coupled to the input circuit of triode 197 of dual triode 140 through condenser 146.

Cathode 194 of triode 197 is also thermoemissive, and plate 190 of triode 197 is maintained at a positive potential by a circuit which may be traced from terminal 297 of power supply 169 as follows: conductors 410 and 418, resistor 152, and conductors 420 and 421 to plate 190. Resistor 155 is the input resistance for triode 197 and is connected at one end to condenser 146 and grid 192, the other end being connected to cathode 194 and grounded. Triodes 197 and 198, together with resistors 155, 156, 152, and 154 and condenser 146, comprise a two-stage resistance coupled amplifier 425 to whose input is applied the signal from the bridge, and whose output signal is coupled through condenser 145 to a discriminator circuit 426 which is about to be described: resistor 153 provides a certain amount of negative feedback between triodes 197 and 198 to stabilize the circuit.

Plates 180 and 181 of triodes 187 and 188 are energized from the terminals of winding 122 by conductors 416 and 417, and the center tap 125 of winding 122 is connected to the cathodes of the triodes through a circuit which may be traced as follows: conductors 422, 423, 425, 426, and 427, field winding 37 of motor 33, conductors 430, 400, 260, 261, 262, 264, 266, and 267, ground, and conductor 316 to junction point 315, and thence by two paths, either along conductor 431 to cathode 184 or along conductors 432 and 434 to cathode 185. The cathodes are maintained thermoemissive by heater 186 which is energized from secondary winding 124 through conductors 283, 472, and 474, the circuit being completed through ground as previously described. The input signal from condenser 145 is impressed upon grids 182 and 183 of triodes 187 and 188 by conductors 440 and 441, 443, and 444. Resistor 151 and condenser 144 are connected between grids 182 and 183 and cathodes 184 and 185 and comprise the input impedance of triodes 187 and 188: condenser 144 serves as a phasing condenser.

The output signal of the bridge and therefore the output signal of the second stage of the amplifier is an alternating current having the frequency of the alternating current in secondary winding 76 of transformer 64 and being either substantially in phase or substantially completely out of phase therewith. The effect of condenser 144 is to completely remove any phase shift, so that the phase angle between the signal on the grids of triodes 187 and 188 of dual triode 141 and the output of secondary winding 76 is almost exactly either 0° or 180°. Since secondary winding 122 is energized from a primary winding connected to the same source of alternating current as primary winding 75 of transformer 64, it follows that the voltage between the upper terminal and the center tap of the transformer is 180° out of phase with the voltage between the lower terminal and the center tap of the transformer, but that one of these voltages is in phase with the voltage impressed on grids 182 and 183. Of the triodes 187 and 188, that one discharges at any time whose grid and plate are both positive: the presence of a negative charge with respect to cathode on either grid or plate tends to inhibit discharge of that particular triode. It is apparent, however, that in either a first or a second half of each cycle of the source a discharge will take place through one or the other of the triodes. This discharge results in the flow of plate current through winding 37 of the motor in a first or a second, opposite phase relation, depending upon which triode discharged. Because the winding is predominantly inductive, this current lags the transformer secondary voltage causing it by 90°. This is not altered by the presence of capacitor 65, which acts only to improve the wave form, the power factor, and the match between the load impedance and the impedance of the tube.

A further circuit can be traced from the source of alternating current through terminal 94, conductor 270, fuse 97, conductors 271, 273, 274, 452, and 453, condenser 66, conductors 454, 455, and 456, field winding 38 of motor 33, conductors 457, 404, 402, 400, 260, 261, 262, 264, 266, and 267 to ground and thence by conductor 280 to the other side of the alternating current line. It is obvious that this circuit is energized at any time that the alternating current line is energized, and that consequently current of a fixed phase flows at all times in winding 38. Since this current is derived from the line feeding the primary of the transformer rather than from the secondary of the transformer, it is 180° out of phase with the output current of the transformer. The impedance of the series circuit including winding 38 and capacitor 66 may be made either predominantly capacitive or predominantly inductive by the choice of a desired value for the capacitor; according to conventional practice this value is such that the series circuit approaches resonance at the frequency being used. Under these conditions, the current in winding 38 is substantially in phase with the voltage producing it; from this voltage the current in winding 37 is displaced by 90° as explained above, and hence the currents are in quadrature. Forward or reverse operation of the motor takes place according to principles well known to those skilled in the art.

Capacitor 65 is selected so that it is of the proper capacitance to form, with winding 37, an antiresonant circuit whose impedance to alternating current of the frequency used is substantially equal to the plate resistance of the triodes 187 and 188: by this expedient efficient operation of the tubes is assured.

In setting up the instrument, conductors 416 and 417 are so connected between plates 180 and 181 and the terminals of winding 122 that plate current flowing through winding 37 in response to an unbalance of the bridge energizes the motor to actuate slider 53 in such a direction as to bring about a rebalance of the bridge, thus reducing the signal to zero and bringing the system to a state of quiescence.

Switch 32 is connected between ground and the junction of conductors 380 and 382 by conductor 460 and by conductor 461, resistor 60 and conductors 402, 400, 260, 261, 262, 264, 266, and 267. The purpose of switch 32 is to test whether the indicator is in operative condition, and upon closing the switch condensers 100, 101, and 111 are shunted by resistor 60, which is of relatively low impedance. This brings about a marked change in the balance condition of the bridge, and if the device is in energized condition the system is immediately actuated to rebalance to this new set of conditions. On releasing switch 32, the circuit is again broken, and the system once more rebalances at the position required by the amount of fluid in the tank.

Numerous values for the components of this circuit may be selected at the choice of the user, but we have found the circuit to operate with especial satisfaction with the components selected as indicated below.

Transformer 64, input voltage—115. Voltage of each section of secondary—115
Resistor 74, 640 ohms
Resistor 36, 50 ohms
Resistor 73, 640 ohms
Resistor 35, 640 ohms
Resistor 34, 250 ohms
Resistor 72, 480 ohms
Resistor 60, 1,000 ohms
Condenser 100, 920 micromicrofarads
Condenser 101, 870 micromicrofarads
Condenser 111, 100 micromicrofarads
Condenser 102, .008 microfarad
Condenser 66, .1 microfarad
Condenser 65, .1 microfarad
Resistor 156, 1 megohm
Resistor 155, 1 megohm
Resistor 154, 1 megohm
Resistor 152, 1 megohm
Resistor 153, .5 megohm
Resistor 151, 1 megohm
Condenser 144, .001 microfarad
Condenser 145, .01 microfarad
Condenser 146, .01 microfarad
Transformer 120, primary voltage 115; voltage of secondary winding 122—350 volts on each side of the center tap; voltage of secondary winding 123—250 volts on each side of the center tap; voltage of secondary winding 124—6.3 volts
Resistor 157, 25,000 ohms
Condensers 147 and 148, .05 microfarad
Duodiode 142, type 7Y4
Dual triode 141, type 7N7
Dual triode 140, type 7F7

*Structure of components*

The arrangement and operation of our invention considered, as a whole having been explained, detailed structure of various components can now be considered.

Figures 2, 4:
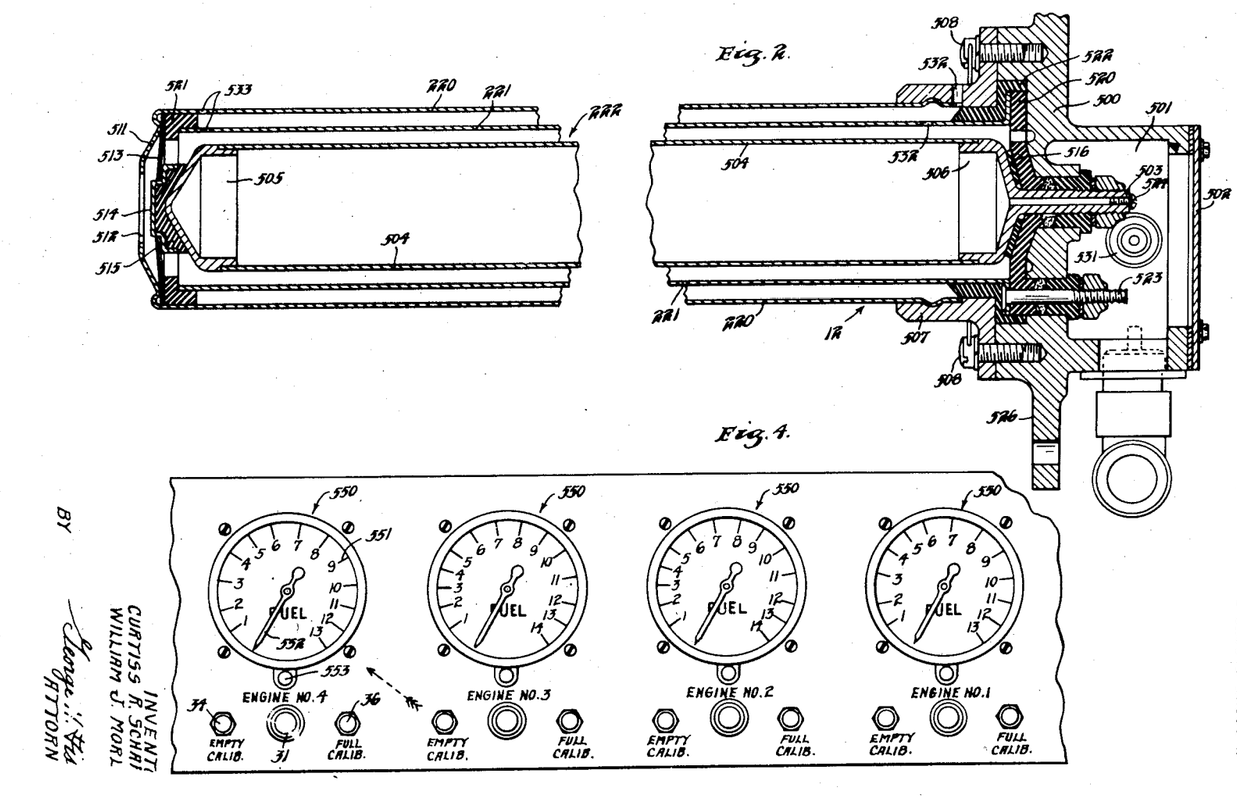
Figure 2 is a longitudinal section of a sensing element used in the practice of our invention.
Figure 4 is a front view of a portion of an indicator and control panel embodying one form of our invention.
Figures 3, 7:
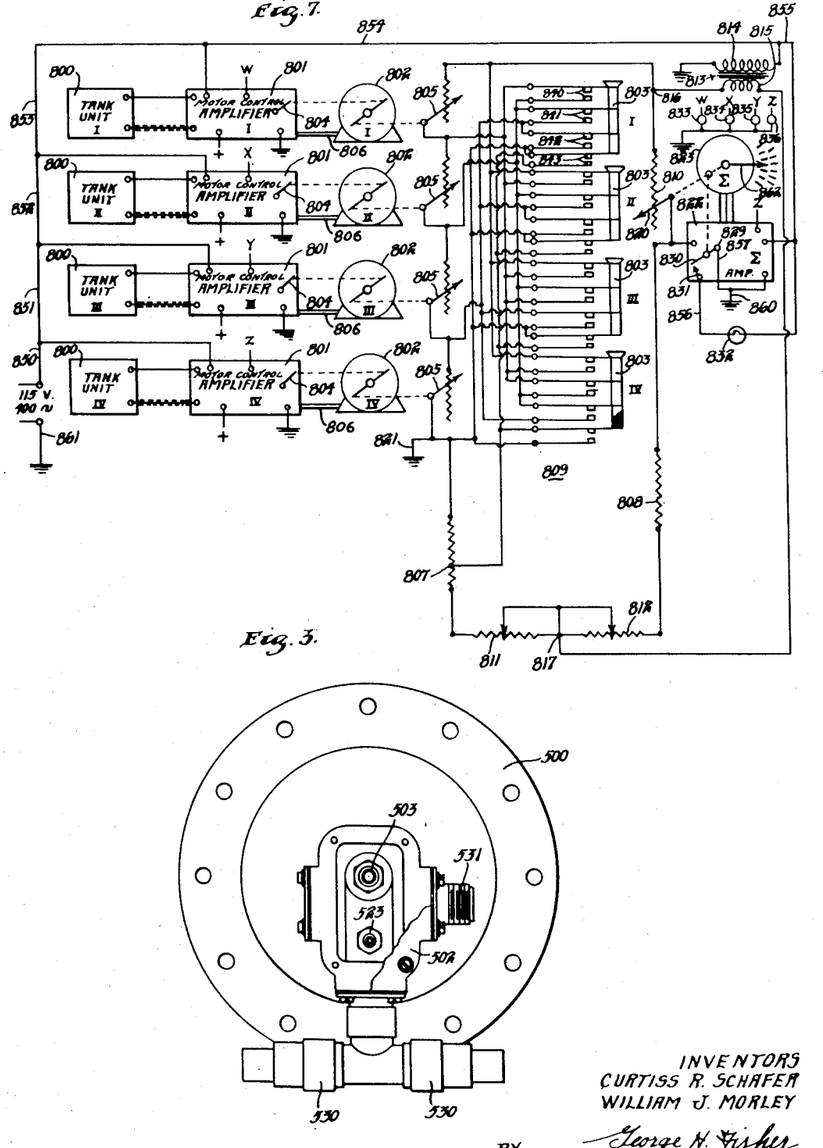
Figure 3 is an end view of the sensing element shown in section in Figure 2, parts being broken away for illustrative purposes.
Figure 7 is a schematic showing of a modified form of our invention.

Figures 2 and 3 disclose a liquid level sensitive capacity type of pickup unit according to our invention, the particular unit corresponding to member 12 in Figure 1. It will be seen that the unit comprises a member or housing 500 having a central recessed chamber 501 provided with a cover 502. Member 500 is provided with a central aperture within chamber 501 to allow the passage of terminal 503 connected to the inner cylindrical electrode 222 of the pickup unit. Member 222 comprises a cylindrical hollow portion 504 and end caps 505 and 506 hermetically sealing the electrode: the outer surface of the entire assembly, with the exception of terminal portion 503, is coated after assembly with an insulating coating such as Bakelite varnish or a ceramic enamel.

Outer or shielding electrode 220 of unit 12 is shown to be spun at one end into a mounting flange 507 which is fastened to housing 500 by any convenient means, such, for example, as safety wired machine screws 508. Electrode 220 has an in-turned portion at the end opposite flange 507 as shown at 511, and this in-turned portion has an aperture 512. A perforated annular member 513 abutting against the in-turned end 511 of outer electrode 220 carries a mounting 514 for block 515 of resilient insulating material against which the upper end portion 505 of inner electrode 222 is adapted to engage. The lower end portion 506 of electrode 222 is held against a resilient member 516 when machine screws 508 are tightened to draw flange 507 against housing 500, member 516 being pressed against an inner supporting flange 520 of electrically non-conducting material to which intermediate electrode 221 is also held under the action of mounting flange 507 and perforated member 513. A stepped annular block of resilient insulating material 521 is arranged for centering electrode 221 within electrode 220 at its upper end and for pressing it against member 520 when the lower bolts 508 are tightened. A further resilient stepped annular member 522 of insulating material is provided between electrodes 220 and 221 at their lower portions to insure proper relative location of these units. A terminal bolt 523 is provided for making connection between the intermediate electrode 221 and the inside of housing 500: this bolt traverses a second opening in member 500, and both openings are closed by suitable packing methods. Electrical connection is made to inner electrode 222 by a suitable terminal screw 524.

In use, pickup unit 12 is inserted into a gasoline tank from below until the upper surface 525 of member 500 engages a mounting gasket on the outside of the gasoline tank: the pickup unit is bolted on in this position with the concentric electrodes projecting upwardly into the tank and the terminals projecting downwardly out of the tank within housing 500. In Figure 3, quickly releasable electrical connecting means 530 and 531 are shown as attached to housing 500 for making it possible to complete the electrical circuit to this unit quickly and easily. A number of perforations 532 in mounting flange 507, outer electrode 220 and intermediate electrode 221 make it possible for gasoline to enter between the electrodes 220, 221, and 222 at the bottom of the pickup unit. It will also be observed that by the structural arrangement of the upper in-turned end of electrode 220 there is a passage for displaced air between electrodes 221 and 222 to escape upwardly from the device. Upper apertures 533 are also provided in member 220 so that gasoline between members 220 and 221 may take the same level as that between members 221 and 222.

Figure 4 shows a control panel suitable for use in the practice of our invention. The panel is in fact a portion of the larger instrument panel which is before the pilot or the flight engineer of an aircraft, depending upon the organization of the flight, and is designed for use with a four-engine craft. It will be seen that the panel comprises four identical stations so far as equipment is concerned, the only difference between the stations being their numbering to correspond to the appropriate engine, and the calibration of the instrument dial to the content of the particular primary tank when full. Each station in this figure contains essentially the elements included in unit 10 of Figure 1, and a median section of one of these stations is shown in Figure 6. Taking for example station No. 4, it will be seen that the face of the panel bears a pilot light 31 and apertures for screw driver adjustment of variable resistors of the volume control type at 34 and 36. In addition, there is an indicator 550 which includes motor 33 and potential divider 35 of Figure 1 and also a graduated scale 551 and a needle 552 movable with respect thereto. A push button 553 is also provided for operating a pair of switch contacts functioning as switch 32 as best shown in Figure 5.

Referring now more particularly to Figure 6, the structure of indicator 550 is more clearly disclosed. The device is shown to comprise a motor 601 having a plurality of field windings 602 and a squirrel cage armature 603 carried on a shaft 604. Rotation of shaft 604 acts through a gear train 605 to cause rotation of an output shaft 606 which is supported in front and back plates 608 and 610 of gear train 605: that portion of shaft 606 extending between mounting plates 608 and 610 has been broken away to more clearly show the gear train. Motor 601 and gear train 605 are mounted in a housing 611 having an insulated cover plate 612. An oil seal member 613 is fastened to member 612 to prevent passage of lubricating fluid from the gear train to the electrical chamber, which is comprised of member 612 and a further flange member 614 which is fastened thereto. A collector ring 615 of electrically conductive material forms a part of member 612, and an endless annular resistance member 616 in the form of a toric winding of resistance wire is mounted in a recess of member 614. A first plurality of spring arms 620 make contact with winding 616, and a second plurality of spring arms 621 make contact with collector ring 615. These spring arms are fastened to a ring 622 of electrical insulating material which in turn is mounted on a hub 623 carried by shaft 606.

Gripped in any suitable fashion between member 614 and an outer cover ring 630 is the graduated dial 551 having an aperture at its center for a needle arbor 633 connecting needle 552 to shaft 606. Ring 630 carries a disk 634 of glass or other suitable transparent material through which operation of the device may be observed. Electrical conductors 641 and 640 make connection with the resistance member and the collector ring, respectively, and conductor 642 makes connection with one of the field windings of motor 601. Other conductors not visible in the present section complete the electrical connection of the motor and variable resistor with other parts of the circuit.

Figure 5:
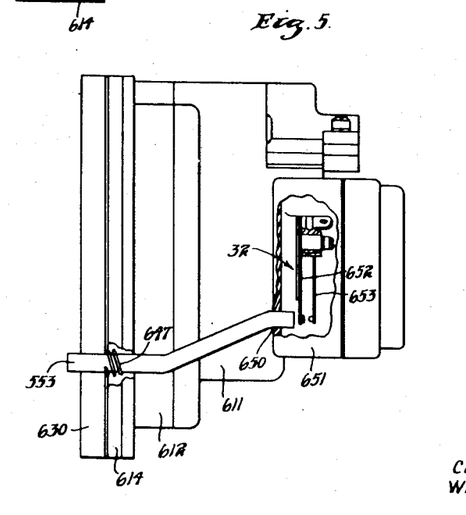
Figure 5 is an elevation, with certain parts broken away, for the sake of clarity, of an indicator as used in the embodiment of our invention disclosed in Figure 4, drawn to a somewhat larger scale and viewed in the direction of the arrow.
Figure 6:
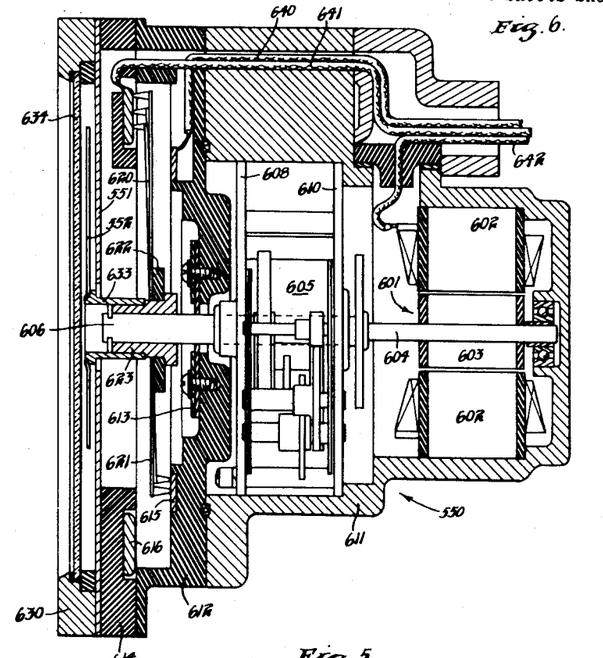
Figure 6 is a longitudinal sectional view of the indicator shown in Figure 5, drawn to a still larger scale.

Figure 5 most clearly discloses the location and arrangement of switch 32 first discussed in connection with Figure 1. In Figure 5 a knob 553 of electrical insulating material, normally spring pressed outwardly by a spring 647, is arranged to enter through an aperture 650 in a housing 651 supporting a pair of contact members 652 and 653. Pressure on member 553 is effective to close the circuit between contacts 652 and 653 and thus energize any electric circuit of which the switch forms a part.

*Construction and operation of Figure 7*

In the embodiment of our invention thus far discussed, continuous indication is made available of the contents of each of the individual tanks, but a knowledge of the total amount of fuel available to the engines of the craft requires calculation. In Figure 7 we show a modification of our invention which gives a continuous indication of the total available fuel but which can be adjusted to quickly give the contents of any particular tank. The figure shows the system as adapted for use with four tanks and is therefore especially adapted to aircraft with four primary tanks and no auxiliary tanks, or to craft with two engines—and therefore with two primary tanks and two auxiliary tanks. For each tank our system provides an instrument channel including a tank unit 800, an amplifier and motor control unit 801, a motor 802 energized from unit 801 through suitable conductors 806, and a push button switch 803. Tank units 800 may comprise one or more condenser pickup members, and amplifiers 801 may include the circuit components shown in units 11, 15, and 16 of Figure 1.

Motors 802 are generally the same as those disclosed in Figures 4, 5, and 6, with the exception that the scale and indicating needle are omitted as no longer necessary. For the sake of clarity in the disclosure and to segregate the operating functions, we have shown each motor 802 as operating a pair of controlled members. One of these members, 804, comprises a rebalancing resistor which is the equivalent of potential divider 35 in Figure 1. The other of the controlled members, 805, is an additional variable resistor, and resistors 805 of the several channels are connected together in series to comprise one arm of a bridge 809. A further variable resistor 810 is provided: the function of this resistor is to rebalance the bridge. In addition to resistors 805 and 810, bridge 809 comprises fixed resistors 807 and 808 and trimming resistors 811 and 812. The bridge is energized from a transformer 813 having a primary winding 814 and a secondary winding 815, the bridge input terminals being shown at 816 and 817. The bridge output is taken from the slider 820 of variable resistor 810, the other output terminal being grounded as at 821.

The upper left arm of the bridge is thus comprised of resistors 805 while the upper right arm of the bridge comprises resistor 810. The lower left arm of the bridge includes fixed resistor 807 and trimmer 811 and the lower right arm of the bridge includes fixed resistor 808 and trimmer 812. Each of resistors 805 is varied in resistance under the control of its associated motor 802 so that the effective resistance of the upper left arm of the bridge is independently influenced by the position of each of the motors. The resistance of variable resistor 810 is varied to rebalance the bridge by a rebalancing motor 823. Motor 823 is energized from an amplifier 822 which is generally identical with amplifier 801, and motor 823 is the same as indicator 550 previously described, except that instead of a single scale of volume it may have two scales of volume, one roughly four times the other: the purpose of this duplication of scales will presently be explained.

Rebalancing of bridge 809 is accomplished by motor 823 by moving slider 820 of variable resistor 810, and at the same time a separate contact arm 830 may be operated about its pivot 829 by motor 823. When all the tanks are full, each of resistors 805 has its minimum value; the effective resistance of the upper left arm of the bridge is also minimum. For a balanced condition of the bridge the resistance of resistor 810 must also be minimum: this means that arm 820 is displaced to its extreme upward position. Similarly, when all the tanks are empty, arm 820 will be at its extreme lower position and the linkage between motor 823, arm 820, and arm 830 is such that when arm 820 has taken this extreme lower position arm 830 is rotated about its pivot 829 until it makes contact with a fixed contact member 831, thus completing an electrical circuit through a visual signal 832 indicating a dangerously low supply of fuel. The circuit energizing signal 832 may be traced from the source of alternating current as follows: conductors 850, 851, 852, 853, 854, 855, signal 832, conductor 856, fixed contact 831, contact arm 830, conductor 857, ground connections 860 and 861 and thus back to the source.

Associated with motor 823 is a needle 862 arranged to move over a dual scale to give an indication of volume of fuel. In the condition of the system as shown in Figure 7, the volume indicated by needle 862 is the total amount of fuel available in all the tanks of the craft.

Associated with needle 862 is a plurality of visual signals 833, 834, 835, and 836 which are identical with signal 31 in Figure 1 and which are energized from the amplifiers of the various channels as indicated in Figure 7 by the reference letters WW, XX, YY, and ZZ. If desired, a second set of visual indicators may be provided at the separate amplifiers, but it is necessary that at least one set of these indicators be located at the main indicator so that failure of any amplifier may be immediately evinced to the operator.

Due to the fact that resistors 805 are connected in series, bridge 809 normally balances, as has been pointed out, in such a position of contact arm 820, that needle 862 gives an indication of the total valuable fuel in the craft. However, the function of push button switches 803 is to provide means whereby the amount of fuel available in any single container in the craft may be indicated by the same indicator 862. Each of push button switches 803 functions to short circuit all of the resistors 805 except that relating to the same instrument channel as the particular switch. For example, pressure on switch button I is effective to short circuit resistor 805 of channel II through a first pair of contacts 840, to short circuit resistor 805 of channel III through a second pair of contacts 841, and to short circuit resistor 805 of channel IV through a third pair of contacts 842. At the same time a portion of resistor 807 is short circuited through a pair of contacts 843. Analogous operation takes place when switch II, III or IV is pressed.

The effect of operation of any one of the switches 803 is to reduce the resistance in the upper left arm of the bridge to that of only one of the resistors 805, which may at the time have any value within its range. The values of resistors 805 in the several channels are continuously maintained such as to give a continuous indication of the fuel in the tank served by the particular channel, and operation of the push button switches brings about no change in this relationship. The change in the resistance of the upper left arm of the bridge is accompanied by a change in the resistance in the lower left arm of the bridge such that its resistance is reduced to one fourth its former value. From this, it follows that if the particular tank under consideration is full and the bridge circuit was balanced before the push button was operated, no change in the balance condition of the bridge takes place and the needle 862 remains at its full indication.

It is obvious that it is desirable to provide a second scale of volume for cooperation with needle 862, so that it is not necessary for the pilot to perform mental calculations to determine what the significance of a full indication may be as applied to a single tank rather than to the total capacity of the craft.

If the tank under consideration is not full the bridge, which is normally maintained in balanced condition by motor 823, is widely unbalanced by actuation of the push button switch, and motor 823 is energized to vary the resistance of resistor 819 until the bridge is again balanced. The reading of needle 862 now corresponds to the volume of fluid available in the tank to which the particular instrument channel is connected.

As soon as the push button switch is released the various resistances are no longer short circuited by the several sets of contacts, and the bridge is again unbalanced, this time in the opposite direction. Motor 823 once more operates to rebalance the bridge to give an indication of the total fuel available in the craft.

It should be pointed out that in case the tanks which the various instrument channels serve are not all of the same volume, it is necessary to provide a plurality of taps along resistor 807 for connection to the several contact pairs 843 of the push button switches. The effective resistance of resistor 807 included in the lower left arm of the bridge when any push button switch is actuated should bear the same relation to the total resistance of resistor 807 as does the volume of the particular tank being measured bear to the total volume of fluid carried by the craft.

It will thus be apparent that in Figure 7 we have disclosed a system for giving a continuous indication of the total amount of fuel available in a plurality of tanks in an aircraft, together with means for so altering the system as to make available in the same indicator an indication of the contents of any single tank, the system automatically returning to its indication of the total volume when the adjusting means is no longer actuated.

Numerous objects and advantages of our invention have been set forth in the foregoing description, together with details of the structure and function of the invention, and the novel features thereof are pointed out in the appended claims. The disclosure, however, is illustrative only, and we may make changes in detail, especially in shape, size, and arrangement of parts within the principle of the invention to the full extent indicated by the broad general meaning of the terms in which the appended claims are expressed.

We claim as our invention:

1. In combination: first and second normally energized voltage dividers having respectively first and second impedance means and first and second tap means making adjustable connection thereto; means connecting said impedance means in series; a fixed impedance unit; a variable impedance unit; means connecting said units to have a common terminal and individual terminals; means connecting said individual terminals to one end of said first impedance means and to said second tap means, respectively, so that the potential of said common terminal varies with said variable impedance; voltage responsive means to be energized in accordance with said variable impedance; means connecting said last named means between said common terminal and said first tap means, so that the response thereof is a measure of the impedance of said variable impedance unit; and means actuated by said voltage responsive means for adjusting said second tap means to bring said common terminal to the potential of said first tap means and for indicating the magnitude of said adjustment.

2. Liquid level responsive apparatus comprising in combination: a variable condenser unit for insertion into a container of dielectric liquid, so that the capacitance of the condenser varies with the level of said liquid; a comparison condenser; means connecting said condensers to comprise a series circuit so that they have a common terminal and individual terminals; a transformer having a primary winding and a secondary winding including end terminals and a center tap; first and second voltage dividers having respectively first and second resistance members and first and second adjustable taps; means connecting one end of each of said resistance members to said center tap on said secondary winding; means connecting the other end of said first resistance member and one of said individual terminals of said series circuit to one of said end terminals of said secondary winding; means connecting the other end of said second resistance member to the other of said end terminals; means connecting the other of said individual terminals of said series circuit to said second adjustable tap; a load impedance; means connecting said load impedance between said common terminal of said series circuit and said first adjustable tap, so that for any setting of said first adjustable tap the voltage across said load impedance is determined by the capacitance of said variable condenser unit and the setting of said second slider; voltage responsive means connected across said load impedance; an indicator; and motor means, energized in accordance with the response of said voltage responsive means to change in the capacitance of said variable condenser unit, for changing the indication of said indicator and adjusting the position of said second adjustable tap to reduce to zero the voltage across said load impedance.

3. Liquid level responsive apparatus comprising, in combination; a variable condenser unit for insertion into a container of dielectric liquid, so that the capacitance of the condenser varies with the level of the liquid; a comparison condenser; means including a source of voltage and a plurality of voltage dividers connected thereto for providing two points of different potential and a third point of intermediate potential, a first of said voltage dividers controlling the potential of one of said two points and the other controlling the potential of another of said points; means connecting said condensers, in series, between said two points; voltage responsive motor control means; means connecting said motor control means between said point of intermediate potential and the junction of said condensers; a motor controlled by said motor control means; means positioned by said motor to adjust said first of said voltage dividers to vary the potential of one of said two points with respect to said other points without affecting the potential of said other points; and an indicator of fuel quantity driven by said motor.

4. In electronic measuring apparatus; a device adapted to sense a condition; a member to be positioned in accordance with said condition; an electrically operated actuator for said member; an electronic amplifier for controlling the energization of said actuator in accordance with changes in the value of the condition sensed by said device; a rectifier adapted to be connected to a source of alternating voltage and connected to said amplifier for supplying direct current voltage to the amplifier; a filter network connected between said rectifier and said amplifier, said filter network comprising a capacitive impedance in parallel with the output of said rectifier and a relay actuator forming a non-capacitive impedance in series with said output; relay contacts associated with said relay actuator and movable from a first to a second position upon deenergization of said actuator; an indicator; and means controlled by said relay contacts and effective upon said contacts moving to said second position upon interruption of current flow through said filter network to render said indicator effective.

5. Liquid level measuring apparatus comprising, in combination: a variable condenser unit for insertion into a container of dielectric liquid, so that the capacitance of the condenser varies with the level of the liquid; a comparison condenser unit; first and second sources of alternating voltage, at least one of which is adjustable without appreciably affecting the other; a first circuit including said first source of voltage and one of said condenser units and a second circuit including said second source of voltage and the other of said condenser units, said circuits having a common portion with respect to which said voltage sources are in opposition so that when the currents through the two circuits are the same, no voltage appears across any impedance in said common portion; a voltage responsive motor controlling means connected across said common portion of said circuits; a motor controlled by said motor controlling means; and means positioned by said motor to adjust only said adjustable voltage upon change in the capacitance of the variable condenser in a direction to reduce the voltage impressed on said voltage responsive means until the latter is ineffective to cause operation of said motor.

6. Liquid level measuring apparatus comprising, in combination: a variable condenser unit for insertion into a container of dielectric liquid, so that the capacitance of the condenser varies with the level of the liquid; a comparison condenser unit; first and second sources of alternating voltage, at least one of which is adjustable without appreciably affecting the other; a first circuit including said first source of voltage and one of said condenser units; a second circuit including said second source of voltage and the other of said condenser units, electrically responsive motor controlling means connected to both said first and second circuits and responsive to the differential in the current flow in said circuits; a motor controlled by said motor controlling means; and means positioned by said motor to adjust only said adjustable voltage upon change in the capacitance of the variable condenser in a direction to reduce the differential in current flow to which said voltage controlling means is subjected until the latter is ineffective to cause operation of said motor.

7. Measuring apparatus comprising, in combination: a variable condenser unit adapted to have its capacitance varied in accordance with a predetermined condition; a comparison condenser unit; first and second sources of alternating voltage, at least one of which is adjustable without appreciably affecting the other; a first circuit including said first source of voltage and one of said condenser units and a second circuit including said second source of voltage and the other of said condenser units, said circuits having a common portion with respect to which said voltage sources are in opposition so that when the currents through the two circuits are the same, no voltage appears across any impedance in said common portion; a voltage responsive motor controlling means connected across said common portion of said circuits; a motor controlled by said motor controlling means; and means positioned by said motor to adjust only said adjustable voltage upon change in the capacitance of the variable condenser in a direction to reduce the voltage impressed on said voltage responsive means until the latter is ineffective to cause operation of said motor.

8. Liquid level indicating apparatus comprising, in combination: a variable condenser unit for insertion into a container of dielectric liquid, so that the capacitance of the condenser varies with the level of the liquid; a comparison condenser unit; first and second sources of alternating voltage, at least one of which is adjustable without appreciably affecting the other; a first circuit including said first source of voltage and one of said condenser units; a second circuit including said second source of voltage and the other of said condenser units; said circuits having a common portion with respect to which said voltage sources are in opposition so that when the currents through the two circuits are the same, no voltage appears across any impedance in said common portion; a voltage responsive motor controlling means connected across said common portion of said circuits; a motor controlled by said motor controlling means; means positioned by said motor to adjust only said adjustable voltage upon change in the capacitance of the variable condenser in a direction to reduce the voltage impressed on said voltage responsive means until the latter is ineffective to cause operation of said motor; an indicator also positioned by said motor to indicate the amount of liquid in the container; first calibrating means connected to one of said circuits for adjusting one of said voltages to insure that said motor moves said indicator to its empty indicating position in the absence of liquid in said container; and second calibrating means connected to one of said circuits for independently adjusting one of said voltages to insure said motor moving said indicator to its full indicating position when the container is full of liquid.

9. Liquid level indicating apparatus comprising, in combination: a variable condenser unit for insertion into a container of dielectric liquid, so that the capacitance of the condenser varies with the level of the liquid; a comparison condenser unit; two sources of alternating voltage, both of which are independently adjustable; a first circuit including a first of said sources of voltage and one of said condenser units in series and a second circuit including in series an adjustable portion of the second of said sources of voltage and the other of said condenser units, said circuits having a common portion with respect to which said voltage sources are in opposition so that when the currents through the two circuits are the same, no voltage appears across any impedance in said common portion; a voltage responsive motor controlling means connected across said common portion of said circuits; a motor controlled by said motor controlling means; an indicator positioned by said motor to indicate the amount of liquid in said container; means also positioned by said motor for adjusting only the portion of the voltage of said second source of voltage in said second circuit between a condition in which substantially no portion of the voltage of said second source is in said second circuit when said indicator is at a first extreme indicating position to a condition in which a maximum amount of said second voltage is in said circuit when said indicator is in its opposite extreme indicating position, said voltage responsive means being operative upon a change in the capacitance of the variable condenser to cause said motor to adjust the portion of said second voltage in said second circuit in a direction to reduce the voltage impressed on said voltage responsive means until the latter is ineffective to cause operation of said motor; first calibrating means connected to said first circuit for adjusting said first voltage source to calibrate said apparatus for the first extreme indicating position of said indicator; and second calibrating means connected to said second circuit for adjusting the voltage of said second voltage source to calibrate said apparatus for the opposite extreme indicating position of said indicator without affecting the first calibration.

10. Liquid level indicating apparatus comprising, in combination: a variable condenser unit for insertion into a container of dielectric liquid, so that the capacitance of the condenser varies with the level of the liquid; a comparison condenser unit; three sources of alternating voltage, at least two of which are adjustable; a first circuit including a first of said sources of voltage and one of said condenser units in series and a second circuit including in series a third and an adjustable portion of a second of said sources of voltage and the other of said condenser units, said circuits having a common portion with respect to which said voltage sources are in opposition so that when the currents through the two circuits are the same, no voltage appears across any impedance in said common portion; a voltage responsive motor controlling means connected across said common portion of said circuit; a motor controlled by said motor controlling means; an indicator positioned by said motor to indicate the amount of liquid in said container; means also positioned by said motor for adjusting the portion of said second source of voltage in said second circuit between a condition in which substantially no portion of said second voltage is in said second circuit when said indicator is at a first extreme indicating position to a condition in which a maximum amount of said second voltage is in said circuit when said indicator is in its opposite extreme indicating position, said voltage responsive means being operative upon a change in the capacitance of the variable condenser to cause said motor to adjust the portion of said second voltage in said second circuit in a direction to reduce the voltage impressed on said voltage responsive means until the latter is ineffective to cause operation of said motor; first calibrating means connected to one of said circuits for adjusting one of said first and third voltage sources to calibrate said apparatus for the first extreme indicating position of said indicator; and second calibrating means connected to the second circuit for adjusting the voltage of said second voltage source to calibrate said apparatus for the opposite extreme indicating position of said indicator without affecting the first calibration.

11. Motor controlling apparatus for controlling a motor in accordance with a variable condition comprising, in combination: a variable impedance whose impedance is varied in accordance with the variable condition; a comparison impedance; two sources of alternating voltage, both of which are independently adjustable; a first circuit including a first of said sources of voltage and one of said impedances in series and a second circuit including in series an adjustable portion of the second of said sources of voltage and the other of said impedances, said circuits having a common portion with respect to which said voltage sources are in opposition so that when the currents through the two circuits are the same, no voltage appears across any impedance in said common portion; a voltage responsive motor controlling means connected across said common portion of said circuits; a motor controlled by said motor controlling means; a member positioned by said motor and movable between first and second extreme positions; means also positioned by said motor for adjusting only the portion of the voltage of said second source of voltage in said second circuit between a condition in which substantially no portion of the voltage of said second source is in said second circuit when said member is at its first extreme position to a condition in which a maximum amount of said second voltage is in said circuit when said member is in its opposite extreme position, said voltage responsive means being operative upon a change in the impedance of said variable impedance to cause said motor to adjust the portion of said second voltage in said second circuit in a direction to reduce the voltage impressed on said voltage responsive means until the latter is ineffective to cause operation of said motor; first calibrating means connected to said first circuit for adjusting said first voltage source to calibrate said apparatus for the first extreme position of said member; and second calibrating means connected to said second circuit for adjusting the voltage of said second voltage source to calibrate said apparatus for the opposite extreme position of said member without affecting the first calibration.

12. Liquid level measuring apparatus comprising, in combination: a variable condenser unit for insertion into a container of dielectric liquid, so that the capacitance of the condenser varies with the level of the liquid; a comparison condenser unit; first and second sources of alternating voltage, at least one of which is adjustable without appreciably affecting the other; a first circuit including said first source of voltage and one of said condenser units and a second circuit including said second source of voltage and the other of said condenser units, said circuits having a common portion with respect to which said voltage sources are in opposition so that when the currents through the two circuits are the same, no voltage appears across any impedance in said common portion; a voltage responsive motor controlling means connected across said common portion of said circuits; a motor controlled by said motor controlling means; means positioned by said motor to adjust only said adjustable voltage upon change in the capacitance of the variable condenser in a direction to reduce the voltage impressed on said voltage responsive means until the latter is ineffective to cause operation of said motor; and means electrically connected to one of said circuits for compensating for the capacitance of said variable condenser unit when the container is empty and said last named means is at one end of its range of adjustment.

13. Liquid level measuring apparatus for controlling a motor in accordance with a liquid level comprising, in combination: a variable condenser unit for insertion into a container of dielectric liquid, so that the capacitance of the condenser varies with the level of the liquid; a comparison condenser unit; first and second sources of alternating voltage, at least one of which is adjustable without affecting the other; a first circuit including said first source of voltage and one of said condenser units and a second circuit including said second source of voltage and the other of said condenser units, said circuits having a common portion with respect to which said voltage sources are in opposition so that when the currents through the two circuits are the same, no voltage appears across any impedance in said common portion; a voltage responsive motor controlling means connected across said common portion of said circuits; a reversible motor having a pair of windings, one of which is permanently energized from a source of alternating voltage and the other of which is energized from said motor controlling means with voltage of one phase or the opposite phase depending upon the phase of the voltage impressed on said voltage responsive means; and means positioned by said motor to adjust only said adjustable voltage upon change in the capacitance of the variable condenser in a direction to reduce the voltage impressed on said voltage responsive means until the latter is ineffective to cause operation of said motor.

14. Liquid level indicating apparatus for indicating the total amount of liquid in a plurality of containers, comprising, in combination: a plurality of motor controlling networks; each comprising a variable condenser unit for insertion into one of the containers of dielectric liquid, so that the capacitance of the condenser varies with the level of the liquid; a comparison condenser unit; first and second sources of alternating voltage, at least one of which is adjustable without affecting the other, a first circuit including said first source of voltage and one of said condenser units and a second circuit including said second source of voltage and the other of said condenser units, said circuits having a common portion with respect to which said voltage sources are in opposition so that when the currents through the two circuits are the same, no voltage appears across any impedance in said common portion, a voltage responsive motor controlling means connected across said common portion of said circuits, a motor controlled by said motor controlling means, and means positioned by said motor to adjust only said adjustable voltage upon change in the capacitance of the variable condenser in a direction to reduce the voltage impressed on said motor responsive means until the latter is ineffective to cause operation of said motor; and a balanceable network common to all of said motor controlling networks comprising means controlled by all of the motors of said networks for unbalancing said common network, a rebalancing impedance, a further motor operatively connected to said rebalancing impedance for adjusting the same, means for controlling the operation of said motor in accordance with the unbalance of said network to cause the motor to adjust said rebalancing impedance in a direction tending to rebalance said network, and an indicator positioned by said motor for indicating the total amount of liquid in all of said tanks.

15. Measuring apparatus comprising in combination; a condenser unit variable in accordance with the value of a condition to be measured as part of the normal measuring operation of said apparatus; a condenser which remains fixed during such normal measuring operation; first and second sources of voltage, one of which is fixed during such normal measuring operation and the other of which is variable during such operation; a circuit including said variable condenser unit and said fixed source of voltage and a further circuit including said fixed condenser unit and said variable source of voltage, so that each circuit has a variable portion and a fixed portion, said circuits having a common portion with respect to which said voltage sources are in opposition so that when the currents through the two circuits are the same, no voltage appears across any impedance in said common portion; a voltage responsive motor controlling means connected across said common portion of said circuits; a motor controlled by said motor controlling means; means positioned by said motor to adjust the variable source of voltage in said further circuit in a direction to reduce the voltage impressed on said voltage responsive means until the latter is ineffective to cause operation of said motor; and indicating means positioned by said motor.

16. In combination: controlled means to be adjusted through a range of positions; voltage responsive means for positioning said controlled means; a balanceable network energizing said voltage responsive means in accordance with the condition of balance thereof; control means in said network variable through a range of values to vary the condition of balance thereof; a potentiometer comprising a resistance member and a tap movable therealong and positioned in accordance with the condition of said control means; a first variable calibrating impedance connected to said network independently of said potentiometer; and a second variable calibrating impedance connected to one of the terminals of said potentiometer, so that when the tap of said potentiometer is at one end of its range of movement, said second calibrating impedance is capable of calibrating said network and when said tap is at the opposite end of its range of movement, said second calibrating impedance is ineffective and only said first calibrating impedance has any calibrating effect upon the balance of said network.

17. Liquid level responsive apparatus comprising, in combination: a variable condenser unit comprising a pair of concentric electrodes adapted to be inserted into a container of dielectric liquid so that the capacitance of the unit varies with the level of the liquid; a fixed comparison condenser; a manually adjustable calibrating condenser connected in parallel with said comparison condenser to adjust the combined capacitance of said comparison condenser and said calibrating condenser; resistance means adapted to be connected to a source of power; means connecting said variable condenser unit and said fixed comparison condenser in series with each other to said resistance means at electrically spaced points; said resistance means having an adjustable tap for defining a point of variable potential with respect to one of said electrically spaced points; an electronic amplifier having an output circuit and at least an input stage including a triode having a control grid and a cathode; means electrically connecting said grid to the junction of said variable condenser unit and said fixed comparison condenser and connecting said cathode to said variable tap so that a voltage is applied to said input stage depending upon the relative capacitance of said variable and comparison condenser units and upon the position of said variable tap; and an electrically operated device connected into the output circuit of said amplifier.

18. In a device of the class described, in combination: a fixed impedance unit; a variable impedance unit; means connecting said units in an electrical circuit to have a common terminal and individual terminals; voltage responsive motor control apparatus; means connecting said apparatus to said common terminal and to a point of reference potential; a source of electrical energy maintaining a pair of output terminals at potentials of opposite senses with respect to said point; means connecting one of said output terminals to one of said individual terminals; means variably connecting the other of said output terminals to the other of said individual terminals, whereby to vary the potential of said individual terminal with respect to said point; motor means energized by said motor control apparatus; and means mechanically connecting said motor with said variable connecting means, so that change in the potential of said common terminal, due to change in the impedance of said variable impedance unit, may be overcome by operation of said motor in response thereto to vary said variable connecting means; and an indicator driven by said motor.

CURTISS R. SCHAFER.
WILLIAM J. MORLEY.

REFERENCES CITED

The following references are of record in the file of this patent:

UNITED STATES PATENTS

| Number | Name | Date |
| --- | --- | --- |
| 1,154,162 | Baker | Sept. 21, 1915 |
| 1,407,078 | Murray | Feb. 21, 1922 |
| 1,516,094 | Hackman | Nov. 18, 1924 |
| 1,573,850 | Naiman | Feb. 23, 1926 |
| 1,665,397 | Wunsch | Apr. 10, 1928 |
| 1,840,635 | Parker | Jan. 12, 1932 |
| 2,123,142 | McMaster | July 5, 1938 |
| 2,188,628 | Freystedt | Jan. 30, 1940 |
| 2,268,411 | Luce | Dec. 30, 1941 |
| 2,270,991 | Bagno | Jan. 27, 1942 |
| 2,285,280 | Johnson | June 2, 1942 |
| 2,300,562 | Freystedt | Nov. 3, 1942 |
| 2,328,954 | Conley | Sept. 7, 1943 |
| 2,354,945 | Cohen et al. | Aug. 1, 1944 |
| 2,357,023 | Reid et al. | Aug. 29, 1944 |
| 2,375,084 | Coroniti et al. | May 1, 1945 |
| 2,377,275 | Smith | May 29, 1945 |

FOREIGN PATENTS

| Number | Country | Date |
| --- | --- | --- |
| 441,576 | Great Britain | Jan. 22, 1936 |
| 818,317 | France | June 14, 1937 |
| 844,440 | France | Apr. 24, 1939 |